USO05510570A

United States Patent [19]
Liu

[11] Patent Number: 5,510,570
[45] Date of Patent: Apr. 23, 1996

[54] EXTERNAL STRUCTURE OF CRYSTAL BALL DRIVEN BY AN ECCENTRIC SHAFT

[76] Inventor: Jian H. Liu, No. 2, Alley 202, Kao Fen Rd., Hsin-Chu City, Taiwan

[21] Appl. No.: 277,303

[22] Filed: Jul. 22, 1994

[51] Int. Cl.$^6$ ............................................. G10F 1/06
[52] U.S. Cl. ................................................... 84/95.2
[58] Field of Search ............................ 84/94.2, 95.1, 84/95.2, 94.1

[56] References Cited

U.S. PATENT DOCUMENTS 5,081,899  1/1992  Hou et al. ........................ 84/95.2

Primary Examiner—Patrick J. Stanzione
Attorney, Agent, or Firm—Larson and Taylor

[57] ABSTRACT

The present invention is directed to an external structure of a crystal ball that has an eccentric shaft and a swinging stick, which is driven by the eccentric shaft. The eccentric shaft is driven by the revolving shaft of the rotary table on the music box. The swinging stick has a longitudinal concave pedestal that is installed on the end of the eccentric shaft, and is driven to swing around the positioning axis by the rotation of the eccentric shaft so that the phenomena of swinging and other motions can be performed by the swinging stick.

13 Claims, 5 Drawing Sheets

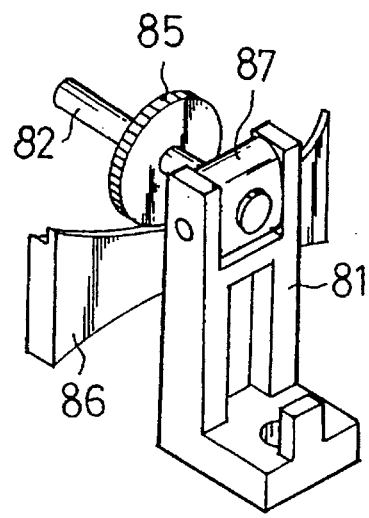
FIG. 6
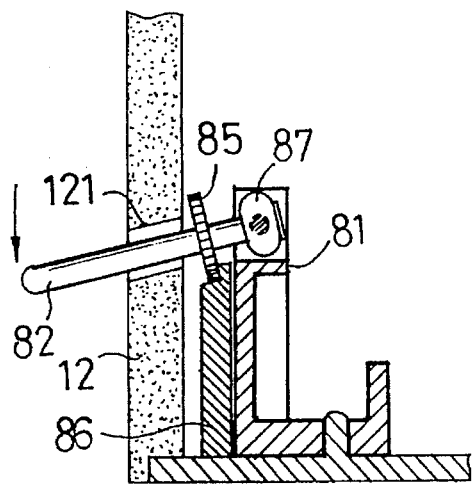 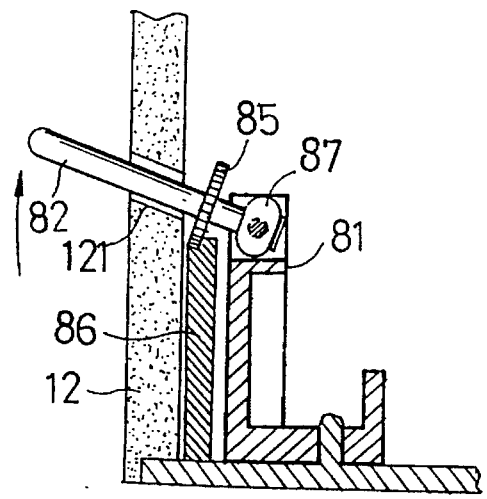
FIG. 7     FIG. 8

5,510,570

EXTERNAL STRUCTURE OF CRYSTAL BALL DRIVEN BY AN ECCENTRIC SHAFT

BACKGROUND OF THE INVENTION

The present invention relates to a conventional crystal ball which has a dynamic presentation powered by a conventional music bell or music box.

DESCRIPTION OF THE PRIOR ART

In prior art devices, in general, the power used to dynamically move an article or adornment visable inside the crystal ball is transmitted from the music box to a mechanism located inside the base of a crystal ball. This mechanism in turn transfers the power to drive the article inside the crystal ball and which performs dynamic motions such as swinging. An example of such structure in the prior art is disclosed in U.S. Pat. No. 5,090,144. According to that patent there is depicted a structure and effectiveness made by the applicant therein of a swinging stick extended into the inside of a crystal ball and supported by a soft rubber bung or stopper on the bottom thereof, and the power of the music bell is only used for providing the dynamic action inside the crystal ball. However, such design disagrees with the need in the market of diversified requests.

SUMMARY OF THE INVENTION

It is an object of the present invention to drive the components extended to the outside of the crystal ball by the power provided from music box so that a plurality of swinging motions can be produced.

In view of the device described in the abovementioned patent, the inventer of this invention made a modification according to the aforementioned structure, so that another dynamic phenomena including horizontal swinging and rotation can be achieved outside the base of the crystal ball. In a specific embodiment, the main structure includes an eccentric shaft mounted on the revolving shaft of the rotary table on the music bell and a swinging pedestal on the base is mounted on the end of the eccentric shaft. In this way, the swinging stick is extended from the swinging pedestal to the outside and can be driven to swing horizontally and rotate.

In particular, the present invention relates to an external structure of crystal ball driven by the eccentric shaft, wherein the eccentric shaft is mounted on the revolving shaft located on one end of the rotary table of the music box. A swinging pedestal on the base located on the end of the eccentric shaft can be driven to swing around the locating axis by the rotation of the eccentric shaft, and then swinging and other motions can be performed outside of the wood base by the extended swinging stick.

BRIEF DESCRIPTION OF THE DRAWINGS

FIG. 6 shows a perspective view of the embodiment 2;

FIGS. 7 and FIG. 8 are diagrams of a swinging stick which is driven to swing upwards and downwards according to a second embodiment;

Figure 1:
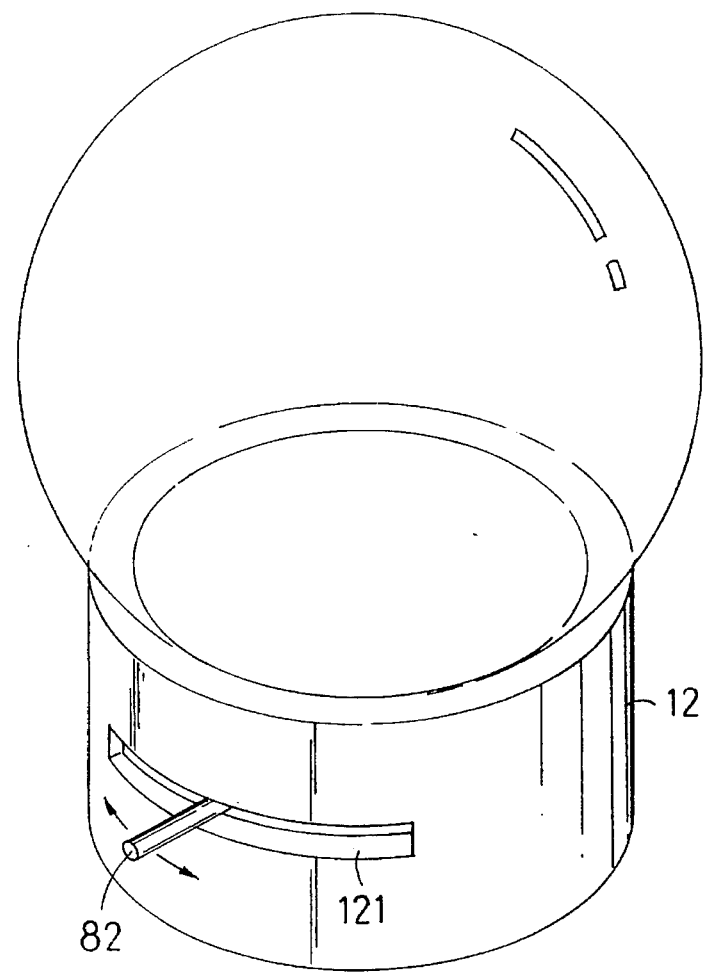
FIG. 1 shows a perspective view of the invention.
Figure 2:
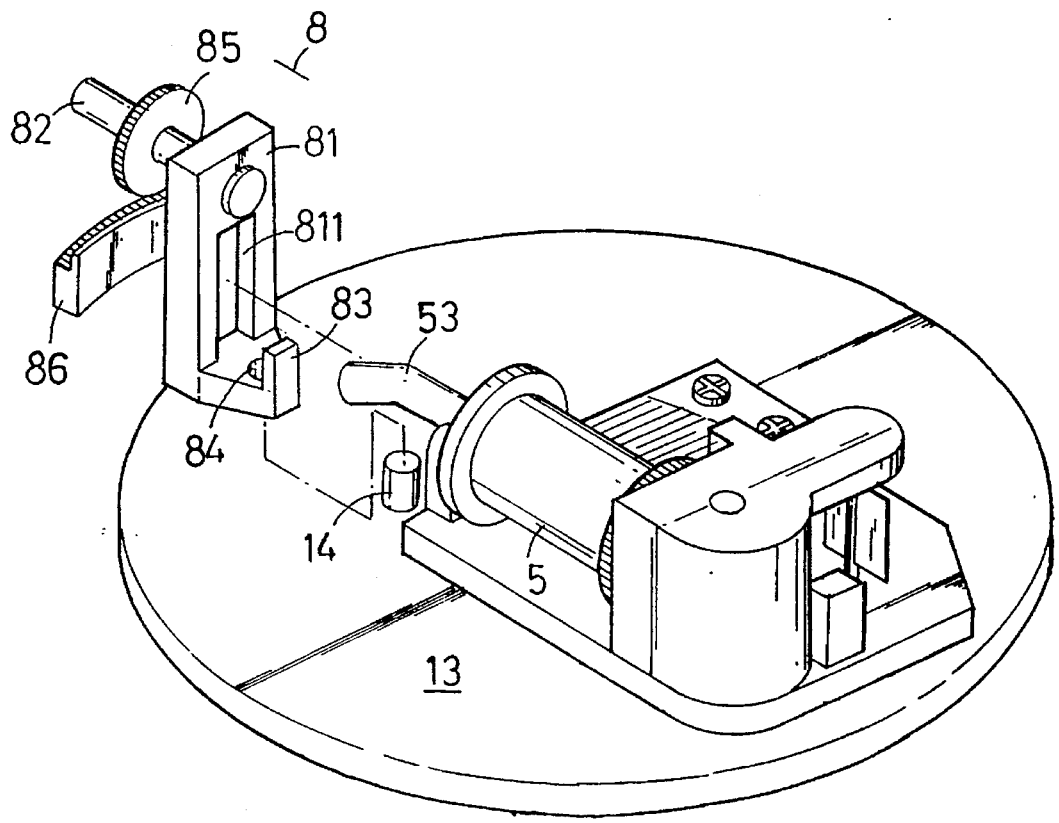
FIG. 2 shows a perspective view of the construction according to the embodiment of FIG. 1.
Figure 3:
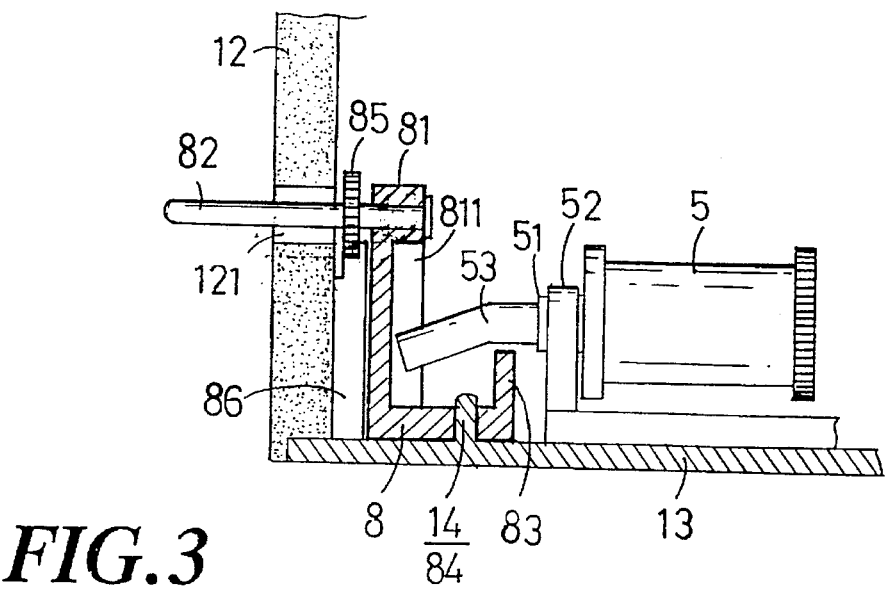
FIG. 3 is a sectional view of FIG. 2.

DESCRIPTION OF THE PREFERRED EMBODIMENT:

FIG. 1 shows a swinging stick 82 extended from the inside of a wood base 12 on the crystal ball to the outside thereof through an aperture 121. Swinging stick 82 is driven to perform various swinging patterns or phenomena by the structure described hereinafter. Furthermore, as illustrated in FIGS. 2 and 3, a conventional music bell or box is located at an appropriate position or location in a base 13 which is screwed on the bottom of wood base 12. An axially eccentric shaft 53 having a distal end portion and a second end that is mounted on a revolving shaft 51 of a rotary coupling or table 5 on the music box is supported by a supporting pedestal 52. This presents an eccentric condition at the end according to a predetermined curvature, so that the end of eccentric shaft 53 will rotate in accordance with the predetermined curvature as the rotary table 5 of the music box rotates.

A longitudinal or upstanding mounting member or concave pedestal 81 is mounted on or integral with a horizontal plate or support member, which together comprise a swinging pedestal 8. Swinging pedestal 8 is located on base 13 with respect to the end of eccentric shaft 53. Concave pedestal 81 has a groove 811 therein which defines a groove surface. The width of groove 811 is wider than the diameter of eccentric shaft 53, so that the end of eccentric shaft 53 can properly penetrate into groove 811.

A swinging stick 82 extends to the outside of wood base 12 through an aperture 121 and is engaged with concave pedestal 81 at an appropriate height. Swinging stick 82 rotates freely, and is connected with a gear 85 on the proper location between concave pedestal 81 and wood base 12.

On the bottom of swinging pedestal 8 there is a longitudinal positioning hole 84 which is located on the concave pedestal 81 with proper distance and the swinging pedestal 8 is positioned and swings around the positioning axis 14 freely by the engagement of the positioning hole 84 and the positioning axle or axis 14 on the base 13. A circular arc rack 86 is centered thereon and is positioned respectively to the bottom of gear 85 on swinging stick 82 on the base 13, which is roughly engaged with rack 86.

Figure 4:
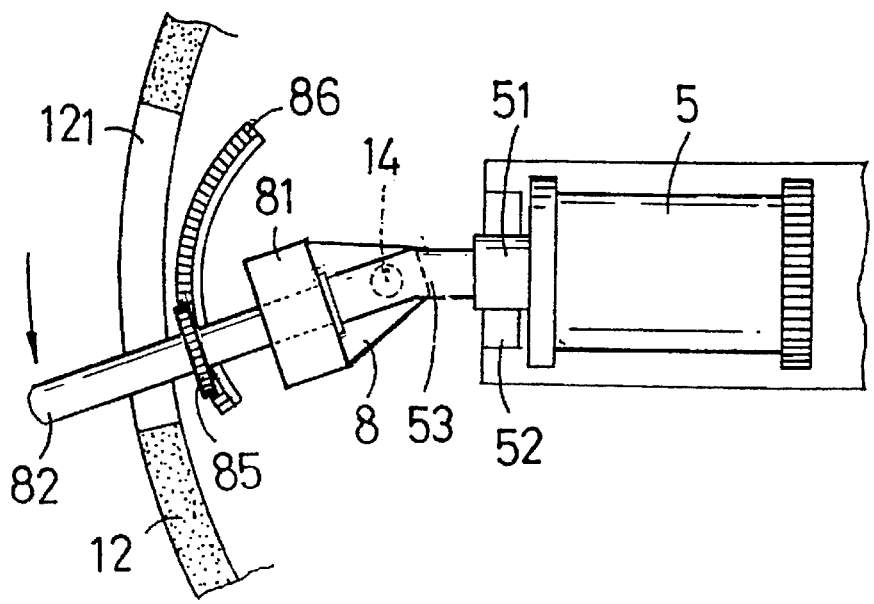
FIGS. 4 and 5 are diagrams indicating the swinging pedestal which is driven to swing according to the embodiment of FIG. 1.
Figure 5:
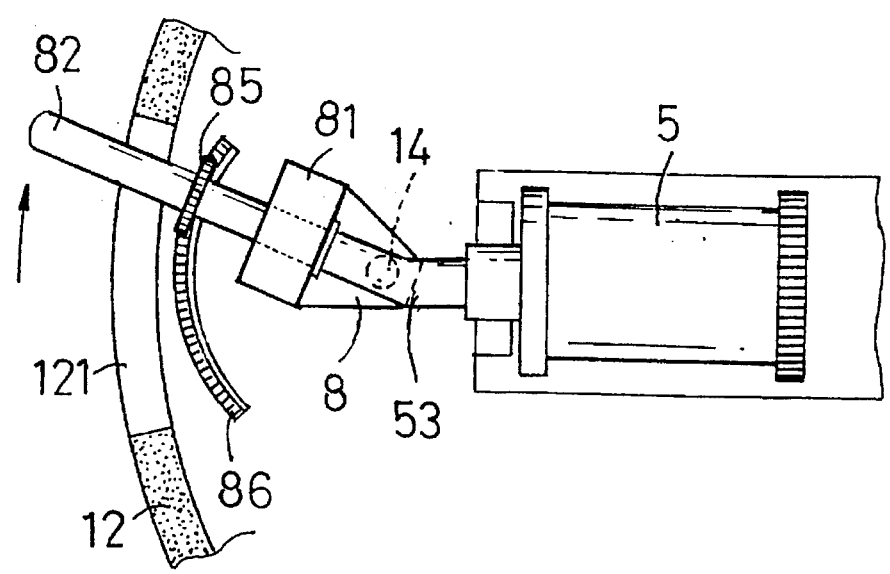

From the combination of the aforedescribed components, because the end of eccentric shaft 53 rotates circularly when eccentric shaft 53 is rotated by the power of rotary table 5, concave pedestal 81 will be driven to swing horizontally around the positioning axis with a respective amplitude by the eccentric shaft 53 which is in the end of the concave pedestal 81, as shown in FIGS. 4 and 5. So, swinging stick 82 extended to the outside of the wood base 12 is driven to swing in the same curvature by swinging pedestal 8. Furthermore, gear 85 located on swinging stick 82 is engaged with rack 86, so that swinging stick 82 rotates with the interaction of rack 86 as it swings. As thus described the present invention provides an adornment connected to the end of swinging stick 82 with a lot of variations in its dynamic movement and presentation.

Moreover, a longitudinal positioning projection 83 is installed on swinging pedestal 8 for preventing to fall out of positioning axis 14 when said swinging pedestal 8 is driven by eccentric shaft 53. Projection 83 is located near the junction of eccentric shaft 53 and revolving shaft 51, and the end of projection 83 is approximately near the bottom of eccentric shaft 53 (but not in contact therewith). By projection 83, any unexpected upward and/or downward movement of swinging pedestal 8 is limited as swinging pedestal 8 is driven.

According to the first embodiment, swinging stick 82 swinging horizontally is driven to rotate with rack 86. In the second embodiment of the invention, as illustrated in FIG. 6, in order that the swinging stick 82 can swing upwards and downwards, rack 86 pivots swinging stick 82 on the upper side of concave pedestal 81 by a pivot block 87. Meanwhile, the swinging stick 82 undulates upwardly and downwardly with rack 86 when it rotates and swings leftwardly and rightwardly if said rack 86 is undulated longitudinally, as shown in FIGS. 7 and 8.

Figure 9:
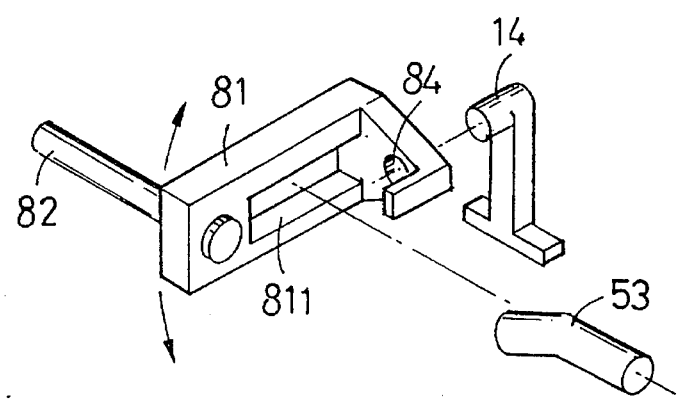
FIG. 9 shows a perspective view according to a third embodiment.

Furthermore, as shown in the first and second embodiments, swinging pedestal 8 is constructed longitudinally, so that swinging stick 82 swings leftwardly and rightwardly. Shown in the FIG. 9 is a third embodiment in which a swinging pedestal 8 located horizontally and supported at a proper height at one side of positioning axis 14, can drive swinging stick 82 to swing upwardly and downwardly with respect to wood base 12.

Figure 10:
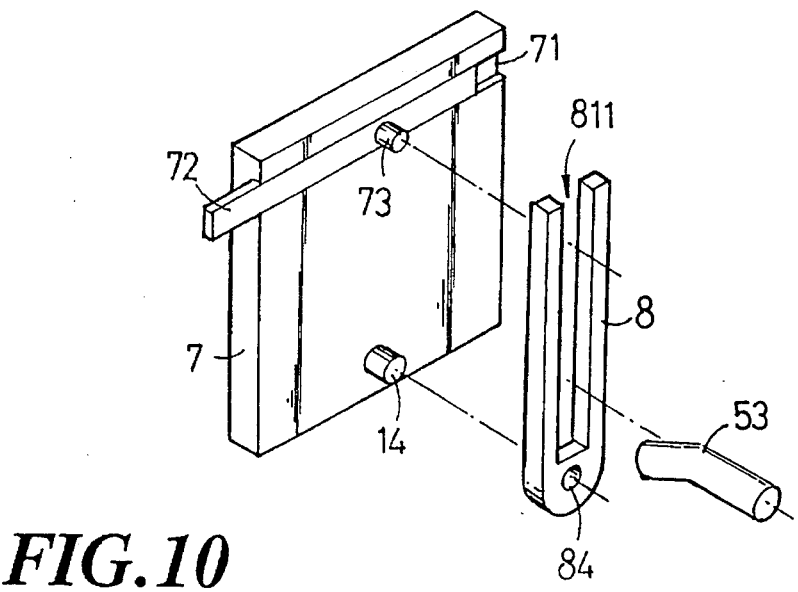
FIG. 10 shows a perspective view according to a fourth embodiment.
Figure 11:
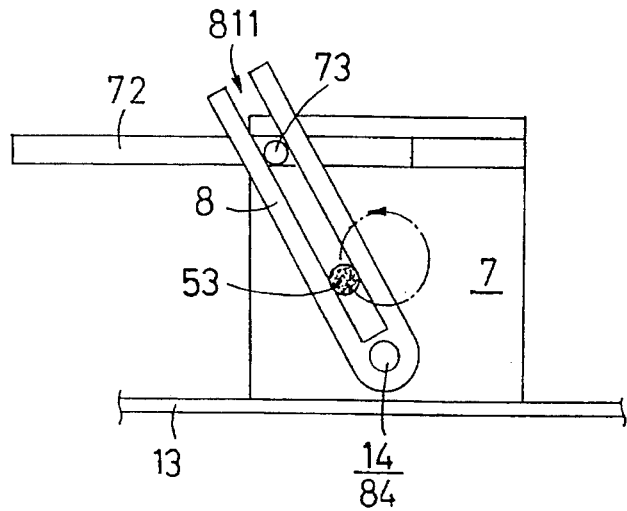
FIGS. 11 and FIG. 12 are diagrams of a sliding bar which is driven leftwards and rightwards by the swinging pedestal.
Figure 12:
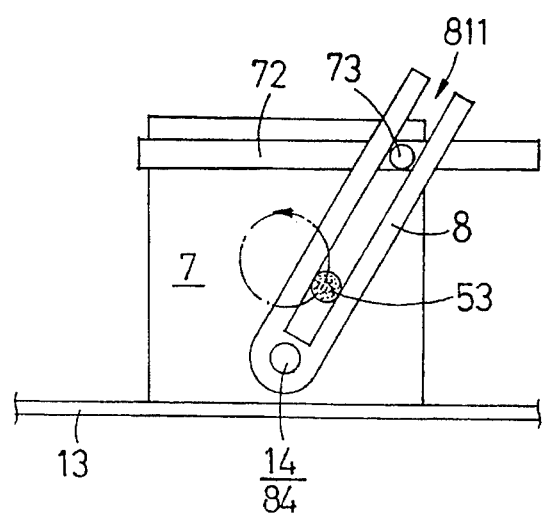

The present invention has still a further modification. Shown in FIG. 10 is a fourth embodiment in which positioning hole 84 on swinging pedestal 8 is axially parallel to the axis of revolving shaft 51. An anchor plate 7 is located on base 13 outside swinging pedestal 8, and a locating axis 14 pivoted positioning hole 84 of swinging pedestal 8 is on anchor plate 7. A slide way 71 which permits sliding bar 72 to slide is mounted on the upper side of anchor plate 7, and a driving block 73 located within the area of groove 811 is formed at the relative location of slide bar 72 to groove 811 on swinging pedestal 8. From the structure described herein above, sliding bar 72 is driven to swing horizontally leftwardly and rightwardly when swinging pedestal 8 is driven to swing around positioning axis 14 by the rotation of eccentric shaft 53, as shown in FIGS. 11 and 12, and the sliding path is determined by the distance between driving block 73 and positioning hole 84. Moreover, the dynamic phenomena of the adornment which get in and out is performed on the outside of the wood base 12 on the crystal ball if the adornment is connected to one side of the slide bar 72.

In summary, the present invention according to the construction of the eccentric shaft connected to the rotary table and the swinging pedestal makes the swinging pedestal be driven to rotate around the locating axis by the eccentric shaft, so that many variations of dynamic phenomena can be performed by the swinging stick extended to the outside of the wood base.

What is claimed is:

1. A drive for an external structure of a crystal ball that includes a base having a side and a bottom and a music box mounted on said base bottom that drives a revolving shaft, the drive comprising:

an eccentric shaft rotated by said revolving shaft;

a swinging pedestal comprised of a support member, an upstanding mounting member connected to said support member, and means for pivotally mounting said pedestal to said base, said mounting member having a groove located therein in alignment with respect to said eccentric shaft, and said swinging pedestal being mounted so that it can swing around a positioning axis; and a swinging stick extended to the outside of the base and moved by said swinging pedestal.

2. The structure as claimed in claim 1, wherein: a gear located on a proper position of said swinging stick between said concave pedestal and said base and is engaged with a circular arc rack on said base.

3. The structure as claimed in claim 2, wherein: said swinging stick is pivotally mounted to said concave pedestal by a pivot block, and said rack is engaged with said gear on said swinging stick.

4. The structure as claimed in claim 1, and further including a positioning projection longitudinally installed on said swinging pedestal is located near where said eccentric shaft is mounted on said revolving shaft, the end of said projection is approximately near the bottom of said eccentric shaft.

5. The structure as claimed in claim 1, wherein: said base includes an upstanding locating axle mounted thereon and said support member of said swinging pedestal has a positioning hole therein that is arranged horizontally and supported by said locating axle to a proper height such that the end of said eccentric shaft is inserted into said groove in said upstanding mounting member and such that said swinging pedestal can pivot about said axis as said eccentric shaft rotates.

6. An ornamental device comprising a base;

a music box mounted on said base and rotationally driving a drive shaft;

an eccentric shaft having a distal first end defining an end portion and a second end mounted to and rotated by said drive shaft;

a swinging pedestal comprised of an elongate member having a longitudinally extending groove therein which defines a groove surface;

means for pivotally mounting said swinging pedestal to said base, said mounting means being located such that said first end portion of said eccentric shaft ie located in said groove and can engage said groove surface;

and a swinging stick extending outside said base and driven by said swinging pedestal.

7. An ornamental device as claimed in claim 6 wherein said swinging pedestal has an L shape with an upstanding portion that contains said groove and a base portion that is pivotally mounted about a vertical axis to said device base such that as said eccentric shaft rotates, said pedestal swings back and forth in an arc and said swinging stick is moved horizontally back and forth.

8. An ornamental device as claimed in claim 7 and further including a rack mounted on said base and a gear mounted on said swinging stick and in engagement with said rack; and wherein said swinging stick is rotatably mounted in said upstanding portion of said swinging pedestal such that as pedestal swings, said swinging stick rotates.

9. An ornamental device as claimed in claim 6 and further including an arcuate rack mounted on said base and a gear mounted on said swinging stick and in engagement with said rack;

wherein said swinging stick has a distal end that extends outside said base and a second end that has an enlarged portion; and wherein said swinging pedestal has an L shape with an upstanding portion that contains said groove and a base portion, and further includes a pivot block for mounting said enlarged portion of said swinging stick such that as said swinging pedestal moves, said swinging stick distal end rotates and oscillates up and down.

10. An ornamental device as claimed in claim 9, wherein said rack has an upper edge in engagement with said gear, said upper edge slants up and down with the vertical in an undulating pattern such that as said swinging pedestal pivots back and forth, said swinging stick undulates upwardly and downwardly as it rotates and is swung back and forth.

11. An ornamental device as claimed in claim 6, wherein said swinging pedestal is comprised of a horizontally extending portion and said groove extends in the horizontal direction; wherein said pivotally mounting means comprises a horizontally extending axle and mounts said swinging pedestal such that as said eccentric shaft rotates, said swinging pedestal and said swinging stick swing in a vertical plane.

12. An ornamental device as claimed in claim 6, wherein said pivotally mounting means comprises a vertical mounting block that is mounted on said base, a horizontally extending axle that is parallel to said drive shaft and is mounted on one of said swinging pedestal and said mounting block, and a positioning hole located in the other of said swinging pedestal and said mounting block; and wherein said groove extends completely through said swinging pedestal, said eccentric shaft end portion extending into said groove from one side thereof; and said ornamental device further including means for driving said swinging stick, said driving means comprising a slide bar slidingly mounted on said mounting block and a shaft mounted on said slide bar and extending into said groove from the other side thereof, said swinging stick being mounted to said slide bar.

13. An ornamental device as claimed in claim 12 wherein the sliding path of said slide bar is determined by the distance between said shaft on said slide bar and said positioning hole.

* * * * *